Patented Jan. 12, 1943

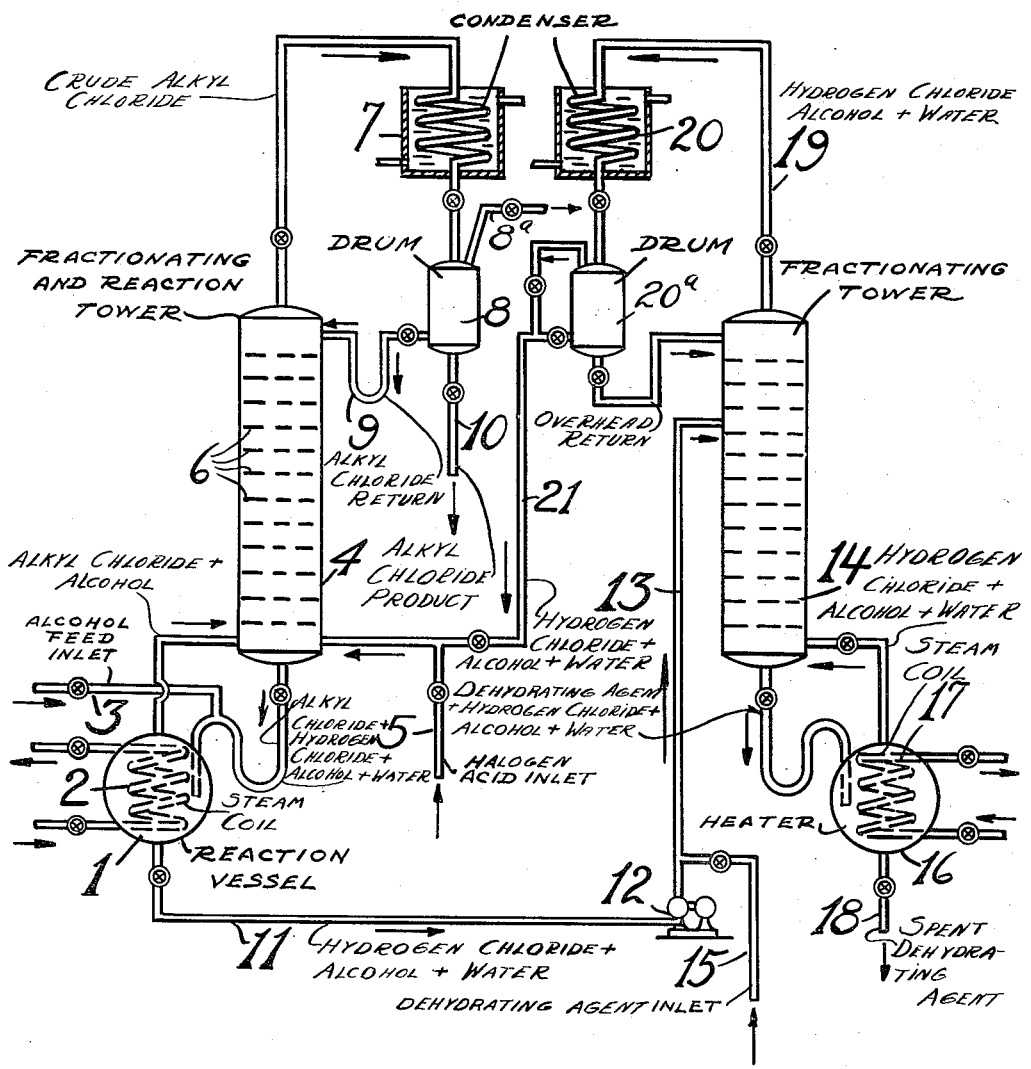

2,308,170

UNITED STATES PATENT OFFICE 2,308,170

PRODUCTION OF ALKYL HALIDES

Arthur D. Green, Cranford, and Charles E. Hemminger, Westfield, N. J., assignors to Standard Oil Development Company, a corporation of Delaware Application December 27, 1939, Serial No. 311,138

7 Claims. (Cl. 260—657)

The present invention relates to an improved process for producing alkyl halides, especially the volatile halides containing one to five carbon atoms. The process is more particularly directed to the formation of alkyl halides by the reaction of an aliphatic alcohol with a hydrogen halide.

Alkyl halides, especially those of low molecular weight, from methyl to amyl inclusive, are quite desirable for various purposes and there is considerable demand for such products. The present process is based upon the reaction of a low molecular weight alcohol with a hydrogen halide, with the formation of the corresponding alkyl halide and water as reaction products. This process has the advantage of not requiring a catalyst and may be conducted at atmospheric or only moderately high pressures, but it will be understood that catalysts may be employed if desired.

In carrying out the above described reaction in a commercial process for the production of ethyl chloride, the water formed in the reaction will accumulate in the reaction chamber, requiring intermittent or continuous removal of the reaction chamber mixture and separation of the water, after which the materials are returned to the reaction zone. The reaction chamber mixture consists chiefly of alcohol, hydrogen chloride and water. It has been proposed to remove water from this mixture by passing the same through a rectifying tower, condensing a part of the vapor product as a reflux for the tower, and returning the remainder of the condensed product and vapors, containing less water, to the reaction chamber or the fractionating tower connected thereto. The economic disadvantage in this process consists in the fact that the residue obtained in the rectification of the reaction mixture contains a large proportion of hydrogen chloride, which necessarily accumulates in the reboiler connected with the rectifying tower as a constant boiling mixture. Such a mixture, when formed at atmospheric pressure, contains about 22% of hydrogen chloride. This process, therefore, involves a material loss in hydrogen chloride, or costly methods of recovering the same.

By the present invention, this loss in hydrogen halide is substantially reduced by introducing into the rectifying tower a dehydrating agent, which will absorb a substantial part of the water in the constant boiling mixture of hydrogen halide and water, thus permitting the hydrogen halide to escape and return to the reaction zone. Any convenient non-volatile neutral or acidic dehydrating agent may be employed for this purpose, such as sulfuric acid, chlorsulfonic acid, sulfur trioxide, ethyl hydrogen sulfate, diethyl sulfate, phosphoric acid, calcium chloride, or the like. The dehydrating agent may be introduced into the system at any convenient point such as in the reactor along with the reactants. However, the dehydrating agent reduces the solubility of the hydrogen halide in the reacting solution and it is more desirable to feed the dehydrating material into the line carrying the reaction chamber mixture into the rectifying tower.

An alternative embodiment of the invention involves the formation of a dehydrating agent by chemical reaction in the rectifying tower. In an example of such a process, an ethyl sulfate, which may be diethyl sulfate or ethyl hydrogen sulfate or a mixture of the two, such as is formed in the reaction of ethylene with sulfuric acid, is caused to react with water in the rectifying tower, the reaction products being ethyl alcohol and sulfuric acid. The ethyl alcohol is distilled overhead in the rectifying column and returned to the reactor, and the sulfuric acid flows downward to the reboiler. The sulfuric acid present in the rectifying column serves as the dehydrating agent to separate the water of reaction from the hydrogen halide in the mixture. In such a case, no additional dehydrating agent is required. Other alkyl sulfates may be employed in a similar manner when other alcohols are to be produced.

The particular alcohol used, of course, depends on the particular halide required, but as ethyl chloride is the product most in demand, the following description of a preferred embodiment of the invention will be limited to the case of the production of ethyl chloride, although it will be understood that other halides may be prepared by the same method. The hydrogen halide, in this case hydrogen chloride, may be introduced in anhydrous form or as an aqueous solution, but the anhydrous form is preferred when reacting with ethyl alcohol in order to reduce the amount of water which must be subsequently separated from the reaction mixture. When an alkyl sulfate is used as the source of alcohol and dehydrating agent, it is preferable to employ aqueous hydrogen halide, in order to provide for the presence of a sufficient amount of water to react with the ester.

The drawing is a diagrammatic view in sectional elevation of an apparatus adapted to produce volatile halides, especially ethyl and methyl chlorides, by the action of the corresponding alcohols with hydrochloric acid.

Referring to the diagram, numeral 1 denotes a reaction vessel or drum, heated by a closed steam coil 2. Alcohol is fed continuously or at intervals into the drum by means of a feed line 3. A fractionating and reaction tower 4 is mounted at the top of reaction vessel 1, and hydrogen chloride, for example, is fed into the bottom of this tower by the line 5. Tower 4 may be filled with any suitable packing material or fractionation plates, as indicated generally at 6, and condenser 7 for cooling and condensing the overhead product is also provided. The condensate from condenser 7 accumulates in drum 8 and a portion of the same is returned to the fractionating column through line 9, while the bulk of the condensate, comprising chiefly ethyl chloride, is removed through line 10 and may be purified, if desired, by means of purification equipment not shown. Fixed gases are released from the system through line 8a, leading from drum 8.

In the case where ethyl chloride is manufactured the reaction vessel is held at a temperature of about 96° C. when under atmospheric pressure, and the condenser at the upper end of the tower will be held at low temperature, say, about 6° or 7° C., so as to condense all but traces of the ethyl chloride. If methyl alcohol were substituted for ethyl alcohol in producing methyl chloride, a lower temperature would be used in the reaction vessel and a lower temperature at the still head. Likewise, with other halides, for example, propyl, butyl or amyl, the corresponding temperatures would be slightly higher. If a higher pressure is used in order to increase the rate of reaction, the temperatures would also be increased in proportion over that used for atmospheric pressure. In any case, the top of tower 4 is maintained at a temperature adjusted so as to provide for refluxing of a portion of the ethyl chloride formed so as to prevent any appreciable quantity of the alcohol from reaching the top of the tower, and in the present case where ethyl chloride is manufactured, the material leaving the top of the tower will comprise a mixture of ethyl chloride, about 5% of ethyl ether and traces of ethyl alcohol. A portion of the condensate produced in the condenser 7 is returned to the tower by pipe 9 for reflux and for maintaining the temperature while the product flows through pipe 10 to the purifying equipment, where the impurities may be removed by water washing operations or by other suitable methods.

Returning now to reactor 1, it has been found that as the process continues water accumulates, with the result that the hydrochloric acid concentration diminishes and the reaction rate continually decreases. This is remedied by continuously or from time to time withdrawing the liquor from reactor 1 by pipe 11, and this is fed to the mid-section of a fractionation tower 14 by means of pump 12 and line 13. Sulfuric acid is introduced into the mixture passing through line 13 by means of line 15, the amount of the acid being preferably 0.2 to 0.4 mol per mol of water present in the mixture passing to the fractionating tower 14. The tower is mounted on a still 16 which is heated by steam coil 17. The residual product, comprising dilute sulfuric acid containing a small amount of hydrochloric acid, is removed by pipe 18, and the sulfuric acid may be recovered in any suitable equipment not shown. The distilled product consists of alcohol, hydrogen chloride, and a small amount of water, and is removed from the tower by pipe 19 and condensed in the cooler 20. A portion of this product is returned to the tower 14 as reflux, and the remainder and the uncondensed vapors are returned to tower 4 or to the reactor 1 for reuse, by means of pipe 21.

In the above process the hydrogen chloride may be introduced into the reaction chamber in a proportion of about 70 to 90 parts by weight per 100 parts of alcohol.

The liquid material when drawn from the reaction chamber 1 consists of about 5 parts of alcohol and 13 parts of hydrochloric acid of 32% strength, the remainder being water; but these proportions may vary considerably, depending upon the particular material produced and the relative proportions of the acid and alcohol used. After rectification in the secondary tower 14, the distilled material, although it still contains some water, contains much less than the liquid withdrawn from the reaction chamber.

An alternative procedure for the manufacture of ethyl chloride, which has been suggested above, consists in introducing into the rectifying column ethyl hydrogen sulfate instead of ethyl alcohol. This compound will react with water to form ethyl alcohol and sulfuric acid. The ethyl hydrogen sulfate may conveniently be produced by passing ethylene into sulfuric acid at an elevated temperature and pressure. In order to conduct the reaction an amount of water equivalent to the ethyl hydrogen sulfate must be present to convert the ethyl hydrogen sulfate into ethyl alcohol, and a further proportion of water must be added to the system to replace that which will be removed by the sulfuric acid in the rectifying tower 14. This water can be added in the form of aqueous hydrogen chloride. In this case the rectifying tower serves not only as a means of separating the water from the hydrogen chloride, but as a means of removing the accumulating sulfuric acid from the system. In this case, of course, no dehydrating agent will be added to the system. A portion of the rectifying tower bottoms will be removed, as necessary, to prevent undue accumulation of sulfuric acid in the system.

The above described process may, if desired, be operated at a moderate pressure 10 to 150 lbs. per sq. in. or even at a higher pressure of several hundred pounds, provided the critical temperatures of the products are not exceeded. A suitable pressure for conveniently operating the equipment without the use of artificial cooling, other than the use of normal cooling water for condensing the ethyl chloride product, is a pressure of about 45 lbs. per sq. in., using a refluxing temperature of about 52° C. It has been found that when operating at this pressure the rate of production is at least eight times as great as under the same conditions at atmospheric pressure. At this pressure the same amount of dehydrating agent is used as at atmospheric pressure, but the temperature in the reboiler is raised about 35° C.

If desired, the reactor 1 may be provided with catalytic materials, among which may be mentioned the various metallic halides such as zinc chloride, ferric chloride, bismuth chloride, and the like.

With regard to the amount of dehydrating agent which should be present in the rectifying tower 14, it is desirable to use such a quantity as will reduce the solubility of the hydrogen chloride in the reboiler solution to the desired level. This will depend on the relative costs of the various materials, the pressure of operations, the type of dehydrating agent used, the reboiler temperature, etc. Consequently, no general rule can be given, for the amount must be determined experimentally for each economic situation. The amount is roughly enough to reduce the amount of hydrogen chloride to 1 to 3 mol per cent in the reboiler solution. For higher pressures the same amount of dehydrating agent is used, but the temperature of the reboiler is increased so that the same $H_2O/H_2SO_4$ ratio is present in the residue from the reboiler, say a 20° C. rise for each time the absolute pressure is doubled. When sulfuric acid is added as a dehydrating agent, a suitable proportion is 0.2 to 0.4 mol per mol of water present in the mixture, preferably about 0.4 mol. When 0.4 mol of sulfuric acid is present per mol of water, the proportion of hydrogen chloride in the constant boiling mixture in the reboiler when under atmospheric pressure is only 0.01 mol per mol of water, as compared with 0.14 per mol of water when no dehydrating agent is present. When ethyl hydrogen sulfate is used in the reaction with hydrogen chloride, sulfuric acid is formed as a reaction product, and the amount produced will be sufficient to eliminate almost entirely the loss of hydrogen chloride through the reboiler or rectifying tower 14.

The present invention is not limited by any of the examples described, which are given by way of illustration only, but is to be considered as limited only by the terms of the following claims in which it is desired to claim all novelty inherent in the invention.

We claim:

1. In a process for producing alkayl halides containing one to five carbon atoms by heating a mixture of an alcohol containing one to five carbon atoms with a hydrogen halide in a reaction zone and separately removing from the reaction zone evolved vapors containing alkyl halide and a residual liquid containing hydrogen halide, alcohol and water, the step which comprises introducing said residual liquid into a rectifying zone along with an amount of a compound of the structure

where R and R' are each members of the group consisting of hydrogen and alkyl radicals containing one to five carbon atoms, which will produce in said rectifying zone during the rectifying process an amount of sulfuric acid sufficient to produce a distillate containing less water than in said residual liquid, but which will not produce in said rectifying zone a molecular ratio of sulfuric acid to water which is greater than about 0.4, rectifying the mixture thus produced in said rectifying zone and returning the distillate so formed to the reaction zone.

2. A process step according to claim 1 in which the compound of the structure

is sulfuric acid.

3. A process step according to claim 1 in which an alkyl chloride is produced by heating a mixture of an alcohol containing from one to five carbon atoms with hydrogen chloride.

4. In a process for producing ethyl chloride by heating a mixture of ethyl alcohol with hydrogen chloride in a reaction zone and separately removing from the reaction zone evolved vapors containing ethyl chloride and a residual liquid containing hydrogen chloride, ethyl alcohol and water, the step which comprises introducing said residual liquid into a rectifying zone along with an amount of a compound of the structure.

where R and R' are each members of the group consisting of hydrogen and ethyl radicals, which will produce in said rectifying zone during the rectifying process an amount of sulfuric acid sufficient to produce a distillate containing less water than in said residual liquid, but which will produce in said rectifying zone a molecular ratio of sulfuric acid to water not greater than about 0.4, rectifying the mixture so produced in the rectifying zone and returning the distillate so formed to the reaction zone.

5. A process step according to claim 4 in which the compound of the structure

is sulfuric acid.

6. A process step according to claim 4 in which the compound of the structure

is ethyl hydrogen sulfate.

7. A process step according to claim 4 in which the compound in the structure

in diethyl sulfate.

ARTHUR D. GREEN.
CHARLES E. HEMMINGER.